(12) United States Patent
Hoekelmann et al.

(10) Patent No.: US 10,786,419 B2
(45) Date of Patent: Sep. 29, 2020

(54) LOCOMOTION AID

(71) Applicant: OTTO-VON-GUERICKE-UNIVERSITAET MAGDEBURG, Magdeburg (DE)

(72) Inventors: Anita Hoekelmann, Niederdodeleben (DE); Susanne Weichelt, Belgershein (DE); Marcel Partie, Magdeburg (DE)

(73) Assignee: Otto-von-Guericke-Universität Magdeburg, Magdeburg (DE)

( * ) Notice: Subject to any disclaimer, the term of this patent is extended or adjusted under 35 U.S.C. 154(b) by 0 days.

(21) Appl. No.: 16/318,255

(22) PCT Filed: Jul. 19, 2017

(86) PCT No.: PCT/DE2017/100598
§ 371 (c)(1),
(2) Date: Jan. 16, 2019

(87) PCT Pub. No.: WO2018/014912
PCT Pub. Date: Jan. 25, 2018

(65) Prior Publication Data
US 2019/0231632 A1    Aug. 1, 2019

(30) Foreign Application Priority Data
Jul. 20, 2016   (DE) .................. 10 2016 113 401

(51) Int. Cl.
*A61H 3/04* (2006.01)
*B60T 7/02* (2006.01)
*B60T 7/14* (2006.01)
*A61H 11/02* (2006.01)

(52) U.S. Cl.
CPC .................. *A61H 3/04* (2013.01); *B60T 7/02* (2013.01); *B60T 7/14* (2013.01); *A61H 11/02* (2013.01); *A61H 2003/043* (2013.01); *A61H 2003/046* (2013.01); *A61H 2201/0165* (2013.01); *A61H 2201/0188* (2013.01); *A61H 2201/1623* (2013.01); *A61H 2201/1628* (2013.01); *A61H 2201/1633* (2013.01); *A61H 2201/5015* (2013.01); *A61H 2201/5097* (2013.01)

(58) Field of Classification Search
CPC .............................................. A61H 2003/046
See application file for complete search history.

(56) References Cited

U.S. PATENT DOCUMENTS

2013/0181489 A1   7/2013   Serhan et al.
2014/0084559 A1   3/2014   Fang

FOREIGN PATENT DOCUMENTS

WO    2004/022371 A2    3/2004

*Primary Examiner* — Noah Chandler Hawk
(74) *Attorney, Agent, or Firm* — W & C IP

(57) ABSTRACT

The invention relates to a locomotion aid (1) for people with limited mobility, comprising at least one frame (1'), frame legs (2) which are connected to the frame (V) at a first end (2') and the second ends (2") of which are equipped with casters (3), a hip lock or a lumbar lock (8) which is connected to the frame (1') via a return mechanism (7) and via a mounting (6), and a seat (9) with an integrated brake triggering mechanism, wherein the seat (9) interacts with the hip lock (8), the return mechanism (7), which is in the form of a spring for example, and the mounting (6) when the seat is actuated by the person such that the brake triggering mechanism (5') can be triggered.

14 Claims, 14 Drawing Sheets

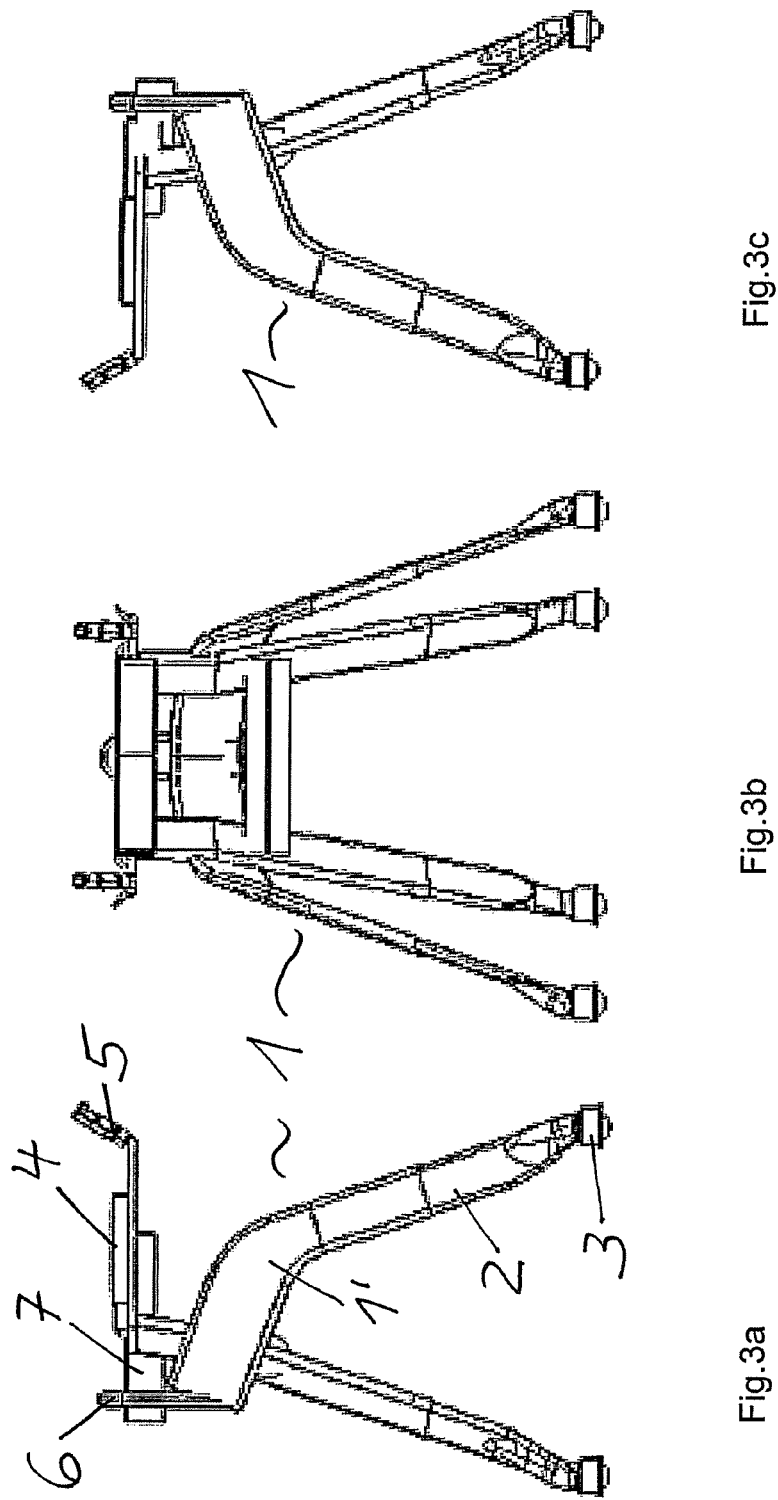

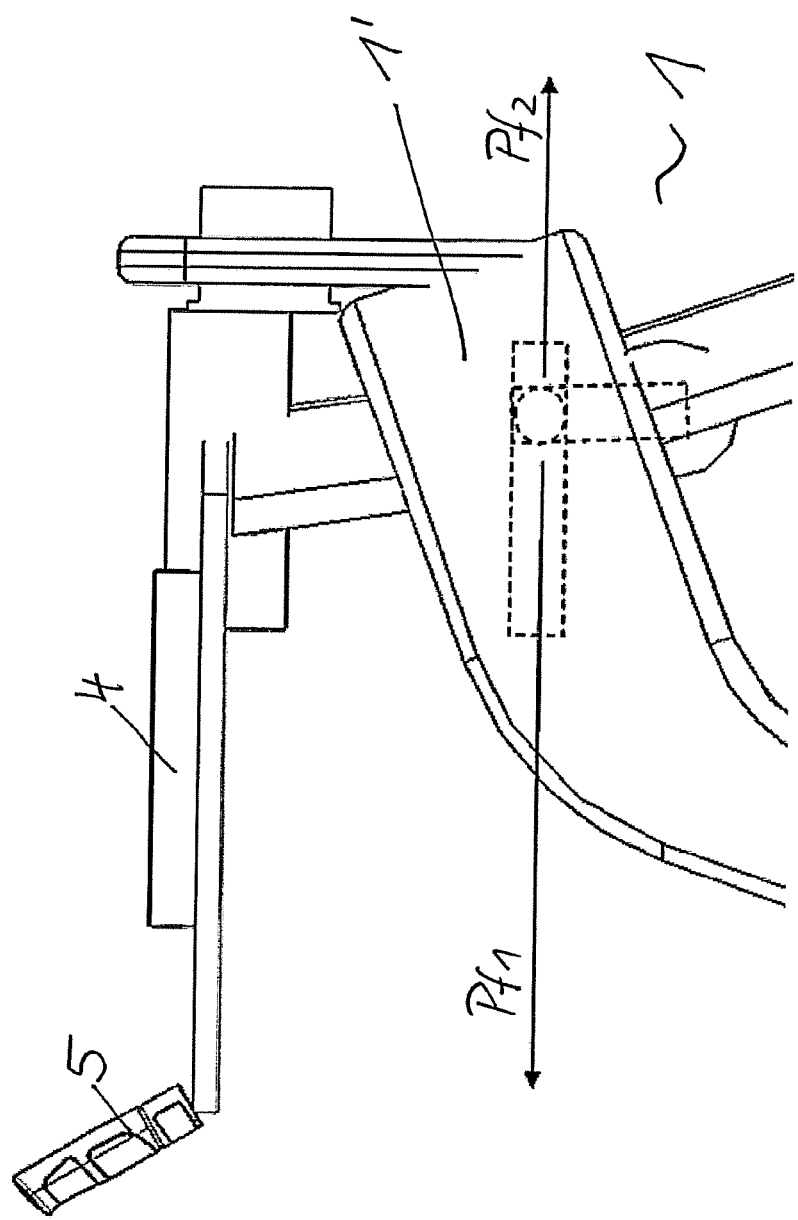

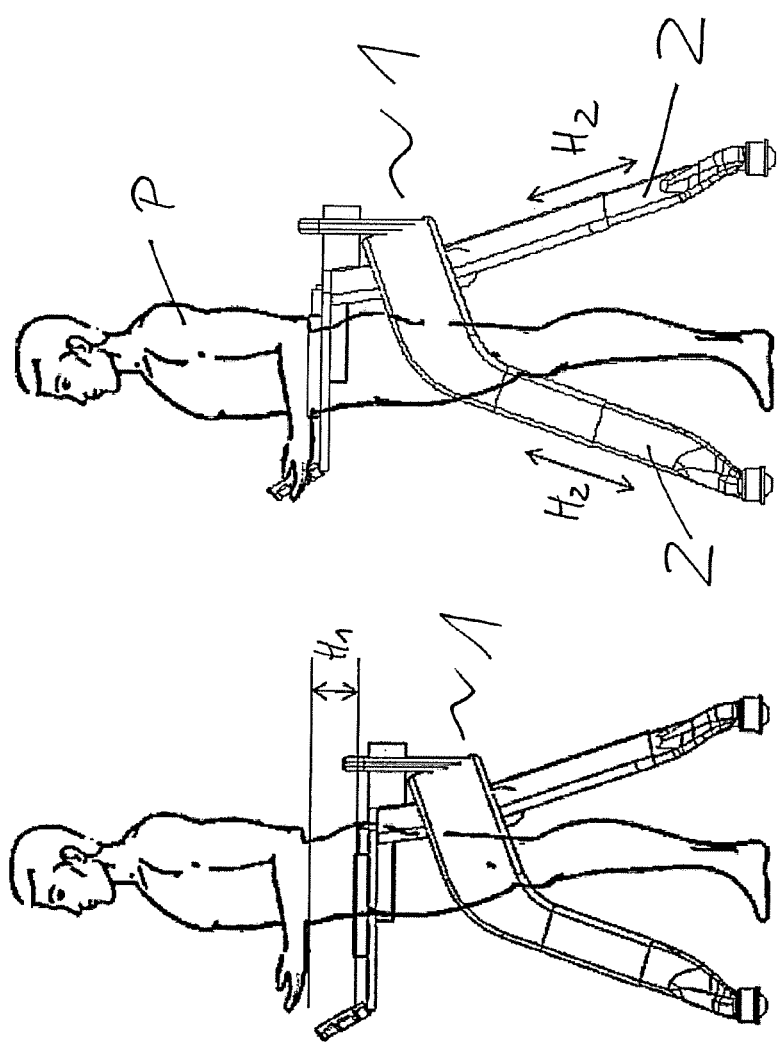

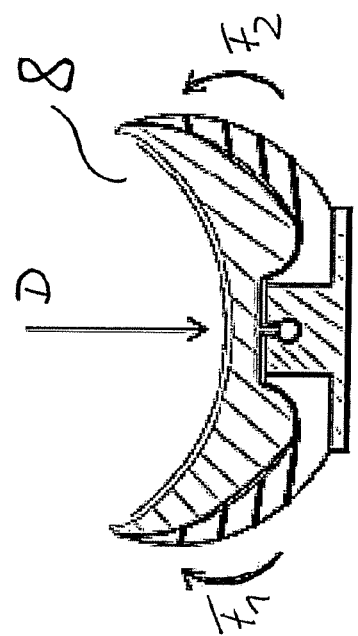
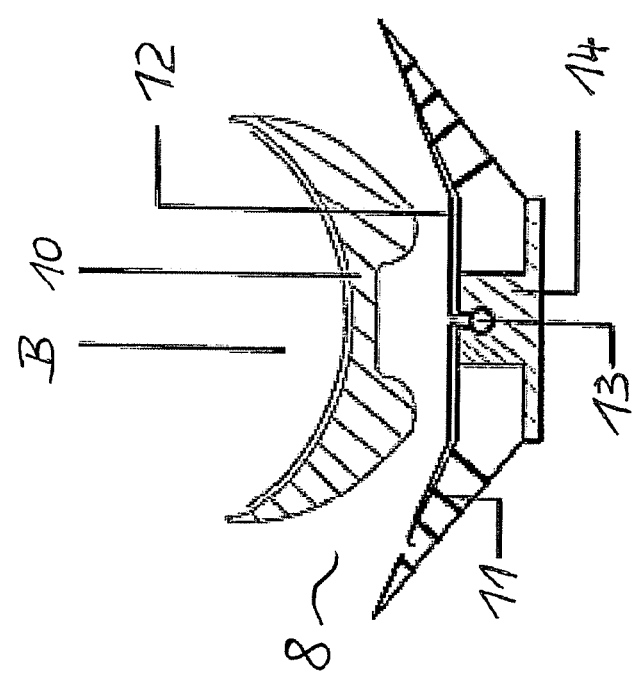
Fig. 5a
Fig. 5b

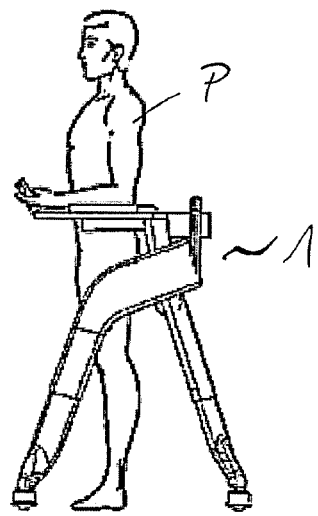
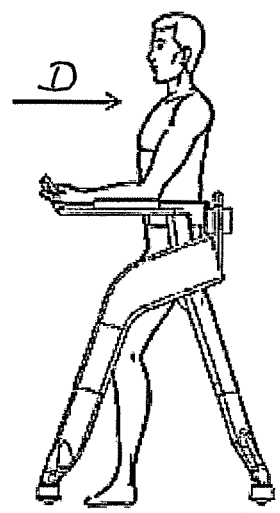
Fig. 6a
Fig. 6b
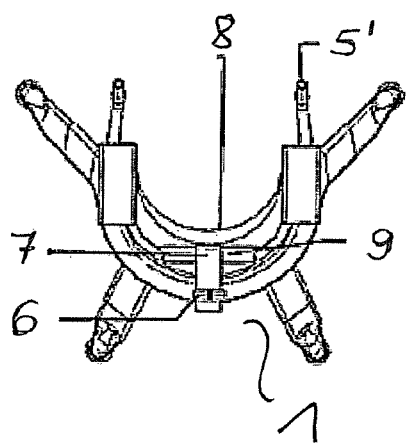
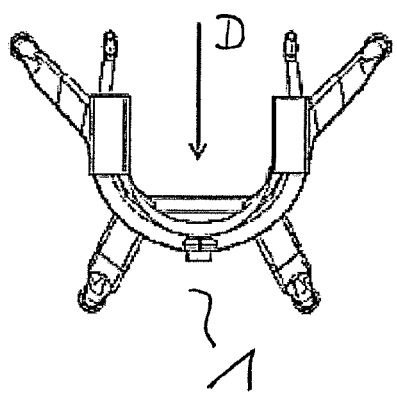
Fig. 6c
Fig. 6d

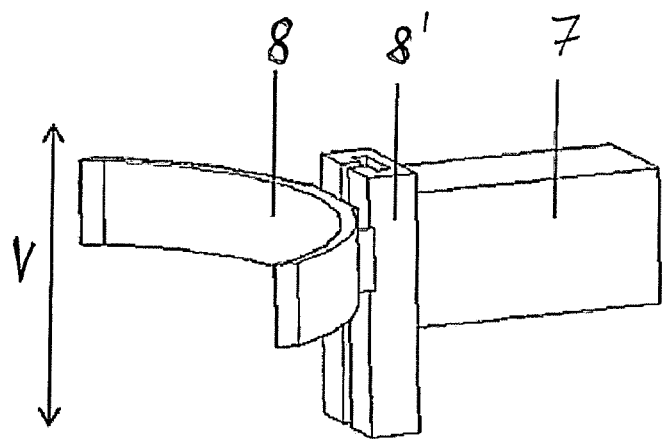
Fig. 7a
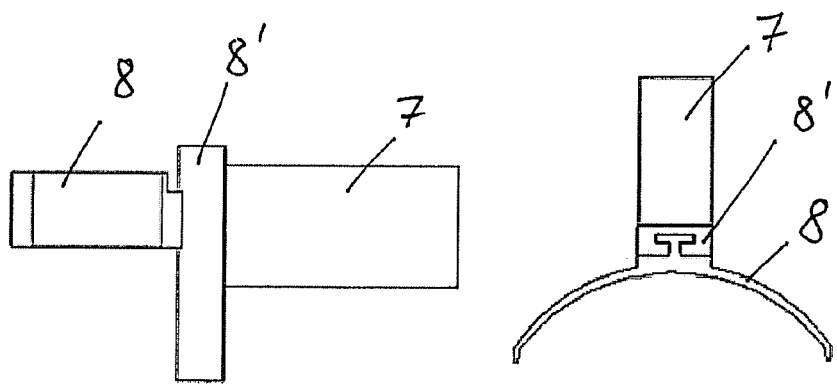
Fig. 7b
Fig. 7c

LOCOMOTION AID

The invention relates to a locomotion aid in the sport/dance and therapy sector, for people with limited motor and/or cognitive abilities.

There are numerous locomotion aids, with preferably three or more wheels, such as, for example, a rollator, for people of different ages and different mobility limitations, for example for people with slight walking problems who use a conventional rollator.

Standard rollators of this type, such as DE10201108005654, are a solution for distances occurring every day, such as walks, shopping or visits to a doctor, for people with mobility problems. Dancing with standard rollators has already since 2011 been part of many sports or movement activities in Germany. However, the standard device and all other commercially available rollator models permit changes in direction in their handling only to a limited extent.

For example, lateral or diagonal rectilinear movements from a standing position are impossible. This has the consequence that, inter alia, the muscle groups of the leg abductors atrophy. These are in turn jointly responsible for stabilizing gait movements and, in the event of degeneration, lead to a higher risk of falling.

What are referred to as castors, as in DE102011080056B4, are used in all standard rollators. Said castors can be rigid or freely movable in the vertical axis of rotation.

During rearward movements, the directional guide has proven difficult to control. Observations using standard rollators have shown that some people have to stop when going backwards and have to reposition or reorient the rollator. A laterally directed movement from a standing position is not possible in the case of standard rollators having two rigid wheels on a single axle. However, in the case of models having four freely movable rollers, the first movement impulse during movements in the opposite direction frequently encounters resistance. This is caused by the rotation via the vertical axis of rotation.

The previously used braking principle via a punch brake is no longer possible in the case of four freely movable rollers since the braking operation previously took place at the rigid wheels.

Furthermore, the braking system of conventional rollators generally has two punch brakes acting independently of each other and having a different braking action. This can lead to a different braking action being obtained when the brakes are used and to the rollator drifting toward one side.

Furthermore, conventional braking systems are always associated with releasing the hand grip in order to obtain a braking action, with one hand surrounding a grip.

DE202004019116U1 describes a mobile aid, such as, for example, a rollator with a seat surface, which a person can push in front of them and which has collision protection. A protection device for preventing physical damage is mounted on the mobile aid. This is an elastic structure which protectively surrounds the hard surfaces of the mobile aid and damps them against impact. The person can only use the seat surface by positioning him/herself with the back toward the rollator, which may lead to falling. The person has to turn through 180° about their own axis.

A training device for building up the muscular system of the walking apparatus, with a holding arm and an inclinable supporting device, is known from DE102008029564B4.

EP2926791A1 discloses a rollator which has a frame and a brakeable wheel, wherein the wheel is blocked only when a predefined force is exerted on the frame in the direction of an underlying surface.

All these disadvantages are intended to be eliminated with the present invention. Against this background, it is the object of the present invention to overcome the disadvantages which have been pointed out.

This object is achieved by a device as claimed in claim 1, wherein further advantageous embodiments emerge from the dependent claims.

A locomotion aid or movement-guiding aid (1) for people with limited mobility is proposed, which comprises at least the following components:
- a frame (1'),
- frame legs (2) which are connected to the frame (1') at a first end (2') and at the second end (2") of which ball castors (3) are arranged,
- a hip lock or lumbar lock (8) which is connected to the frame (1') via a return mechanism (7) and a mounting (6),
- a seat (9) with an integrated brake triggering mechanism, wherein
- the seat (9), upon actuation by the person, interacts with the hip lock (8), the return mechanism (7), for example in the form of a spring system, and the mounting (6) in such a manner that the brake triggering mechanism (5') can be triggered.

The locomotion aid is distinguished by its frame shape and the dimension thereof. The user can thereby carry out unlimited movements. The lumbar lock or hip lock (8) serves for the person to take up an upright body posture and for secure use of the rollator or of the locomotion aid. The brake which can be triggered with the seat, also called brake triggering mechanism, serves for the user to implement a break or to carry out exercises while sitting and triggers a braking action on the ball castors (3) by action of weight.

For example, it provides the possibility for people with limited motor and/or cognitive abilities to train their physical and mental capabilities in order thereby to obtain their independence in everyday life.

The design of the locomotion aid affords a series of advantages and diverse combination possibilities for additional devices. The user can stand centrally in the rollator and supports him/herself against the forearm supports. From the central position of the user, which is secured by the hip lock, and the conical frame shape, little risk of tipping arises for the user.

Since exercises also take place in groups and therefore a plurality of rollators or locomotion means may be in the area of movement, collision protection, preferably in the form of a spacer between the individual rollators or locomotion means can be provided as a damping system for protecting the outermost components (1). Devices for a drinking bottle are also possible.

Investigations have shown that mechanisms for collision warnings are not practical methods of preventing collisions with objects or other devices. Firstly, the user, because of his/her mental deficit, reacts too slowly to the transmitted warning signals or, secondly, the signals often cannot be directly interpreted by the user. The approach of collision protection with the effect of a spacer or damping system of the outermost components is therefore a substantially user-oriented approach.

One embodiment of the invention makes provision for the frame legs (2) to be height-adjustable.

For example, automatic adaptation of the frame to the height of the user can take place by means of a blocking gas-filled spring which can be infinitely variably adjusted into any lifting position. The height adjustment at the same time provides adaptation to the supporting surface of the rollator or of the locomotion aid.

In one embodiment of the invention, it is provided that the locomotion aid has arm supports (4) on which handles (5) are arranged, wherein the arm supports (4) are connected to the hip lock (8). In addition, said handles can be displaceable horizontally in order to be adapted to the forearm length of the particular user.

It is provided that the frame of the locomotion aid (1) is conical. By means of said conical shape and the central position of the user in the locomotion aid, the risk of tipping of the latter is very low since the center of gravity does not go beyond the rollator or the locomotion aid.

One embodiment of the invention makes provision for the hip lock (8) of the locomotion aid (1) to at least comprise the following components:
- adaptation means (10), in order to trigger the self-adaptive locking mechanism of the hip lock 8),
- connecting elements (11) between the outer walls of the hip lock (8),
- a non-elastic outer side (12) of the hip lock (8), a manual adjustment mechanism (13) for shortening the non-elastic outer side (12),
- a connecting element (14) between the hip lock (8) and the spring system (7) with a "look function", wherein "B" indicates a region in which the user or a person stands.

The locomotion aid (1) described can be designed and used as a sports rollator, therapy rollator or dance rollator. The rollator can preferably be used in care homes, hospitals, sanatoria, sports facilities for senior citizens and in the private sector, i.e. within the home.

People with cognitive deficits (mild cognitive impairment disorders, dementia), which are frequently accompanied by mobility limitations, can therefore obtain a movement-assisting sports and therapy device with intuitive user control.

The invention relates to a movement-assisting device which particularly permits usage and use in movement games and musical therapeutic exercises.

This is a bionically self-adaptive device, for example with intuitive user control, comprising an automatic seat braking system, automatic frame adaptation to the body height, a self-adaptive hip lock, reaction-free ball castors with a braking function, collision protection, a movement tracking system and a space-saving lightweight frame.

The aim of the technical realization is to meet the physical demands of the target group mentioned. Demands are expressed in a different meaning from product attributes, such as, for example, the demand for safety when handling the device or using a braking system. Furthermore, neither an underload nor overload may be caused during the general use of the sports and therapy device.

During the use of the device according to the invention, the user (P) adopts a more upright body posture. The user is in a fixed position here because of the forearm support, the handle position and the hip lock.

Furthermore, movement directions can be initiated not only via the arms, but additionally also by the control impulse of the upper body, via the hip lock and can therefore act in an assisting manner for carrying out a movement. Safety functions, such as braking via a seat brake, can be realized without the latter being operated actively. Only weight acting on the seat brings about blocking of the ball castors.

Omission of brake levers or similar active mechanisms means that the stable leaning and secure hand grip of the user does not have to be released for activating the braking system. This in turn affords a high degree of movement control and safety for the user.

Furthermore, self-adaptive adjustment mechanisms are intended to make it easier for the user to adapt to the device and to prevent erroneous adjustment.

The features and advantages of self-adaptive technique solutions for the rollator according to the invention will be described in more detail below. Self-adaptive technique means:
- automatic frame adaptation,
- self-adaptive hip lock,
- seat braking system,
- reaction-free ball castors with braking function,
- movement tracking system,
- collision protection,
- space-saving lightweight frame.

Manner of Operation of the Lumbar Lock:
- By means of vertical guidance of the hip-surrounding region (11) in FIG. 5a or FIG. 7a, the lumbar lock can be varied in height. The up and down movements of the upper body, which can be caused by flexion of the legs of the person on account of relatively large steps or other exercises, can thus take place.
- The locomotion aid can be forwardly open, i.e. freely accessible to the user or the person.
- The locomotion aid can also be forwardly closed.
- The latching mechanism fixes the hip lock in the starting position; when the user (P) is in the rollator, a locking mechanism or a return catch is in action here;
- The hip or lumbar lock is subsequently released in such a manner that it can be guided rearward and the user can take up a sitting position, and the lumbar support or hip lock (8) serves here as a backrest.
- The lumbar support or hip lock (8) can be equipped with vibration elements in order to provide the user with tactile stimuli, such as movement direction or pace, i.e. can serve as a rehabilitation measure.

Manner of Operation of the Seat Brake:
- the seat can be unfolded or folded over, for example the seat can consist of two seat halves which can be unfolded, or a seat surface can be folded over from the rear; similarly, two half shells in conjunction with a fabric surface can be provided, said half shells being arranged in the rollator frame inner sides, said two half shells can be pivoted downward in order for the fabric surface to be spread open as a seat surface and backrest surface;
- a continuous seat roll for resting on at 75-80% of the normal height of the posterior, i.e. the seat is located at a height of approx. 75-80% of the height of the posterior and serves for short relaxation breaks, wherein the normal seat height for exercises (can be folded down or folded out in a foldable manner) is approx. 45-60 cm;
- the seat roll can be adjusted in the horizontal direction; the folding seat is likewise adaptable.
- The braking mechanism is transmitted to the castors via hydraulic transmission of pressure by means of body weight. A ring surrounds the castors here; said ring reduces its radius on account of the increase in pressure and prevents movement of the castors.

The transmission of braking force can also take place via a mechanical principle by means of a Bowden cable.

Principle of the Braking Action on the Ball Castors:

The ball castors are surrounded by a ring which can be changed in circumference and can be changed in its diameter in such a manner that the movement of the ball castor can subsequently be prevented, wherein the ring brings about a braking force on the ball.

The rolling movement of the ball can be transmitted via two rollers to two perforated segmented disks. From the direction of rotation and speed thereof, electrical pulses are generated via incremental transmitters with small light barriers. The relative coordinates of the individual balls are then placed in a ratio with respect to one another via an algorithm. The movement of the user with the rollator, and not only the individual ball castors, can therefore be detected.

With the locomotion aid illustrated, people with limited mobility can carry out regular sporting exercises which not only promote blood circulation through the vessels, but also reinforce the muscles and the strength of the bones. In addition, they stimulate the growth of new nerve cells and can also counteract cognitive losses in performance in old age.

The locomotion aid will be illustrated by way of example with reference to a plurality of figures, but the invention is not restricted thereto.

In the figures:

FIG. 1 shows schematically the design of a locomotion aid (1) for people with limited mobility in an isometric illustration, FIGS. 2a and 2b show schematically a rollator position with a person standing, 2a and sitting, 2b, in side view, FIGS. 3a-3g show schematically the locomotion aid from FIG. 1 in a plurality of views, FIGS. 4a-4d show schematically the frame adaptation of the locomotion aid from FIG. 1 to the height of a person in side view (FIGS. 4a and 4b) and the height adjustment according to FIGS. 4c and 4d, FIGS. 5a, 5b show schematically the hip lock in the locomotion aid (1), FIGS. 6a-6d show schematically the guiding back of the hip lock as a person sits down in the locomotion aid (1) according to FIG. 1, FIG. 7a shows schematically the vertical displacement of the hip lock of the locomotion aid from FIG. 1, FIG. 7b shows the side view and, in FIG. 7c, a top view of FIG. 7a, FIG. 8 shows a schematic illustration of the seat braking system of the locomotion aid from FIG. 1, FIG. 9 shows schematically the braking action mechanism on the ball castor of the locomotion aid from FIG. 1, FIG. 10 shows schematically a principle of the optomechanical detection of movement, used in the case of the ball castor of the device (1) from FIG. 1.

FIG. 11 shows schematically the design of a locomotion aid (1) for people with limited mobility, in an isometric illustration.

The locomotion aid (1) here comprises at least one frame (1'), height-adjustable frame legs (2) which are connected at one end (2') to the frame (1') and, at the second end (2"), ball castors (3) are arranged, a self-adaptive hip lock or lumbar lock (8) which is connected to the frame (1') via a return mechanism (7) and a mounting (6) of the hip lock, a seat (9) with an integrated brake triggering mechanism, wherein, upon actuation by the person, the seat (9) interacts with the hip lock (8), the spring system (7) and the mounting (6) in such a manner that the brake triggering mechanism is released.

The return mechanism with what is referred to as a look function is responsible here for changing the hip lock from standing to sitting. The hip lock is guided back automatically during rising into a standing position. In addition, arm supports (4) with handles (5) are provided. The mounting (6) serves for receiving the devices relevant to the hip lock, i.e. for the hip lock (8) and the return mechanism (7).

FIGS. 2a and 2b show schematically a rollator position with a person (P) standing, 2a, and sitting, 2b, according to FIG. 1, in side view.

Automatic Frame Adaptation:

Adaptation to the height is indispensable in order to guarantee correct, secure and effective use of the device. However, the height adjustment previously in known locomotion aids has been highly complicated and generally has to be carried out by at least one further person.

The requirement for automatic adaptation of the frame to the height of the user is therefore intended to take place via an adjustment system which adjusts all four frame legs (2) in an infinitely variable manner in each lifting position by means of a blocking gas-filled spring. This is possible both elastically, i.e. resiliently, and also rigidly. It can also take place via a mechanical locking mechanism, such as, for example, locking by means of locking bolts in holes provided for this purpose at corresponding distances or by means of infinitely variable adjustment by tube turnbuckles which fix the rollator legs (2) at a desired height.

FIGS. 3a-3f show various views of the locomotion aid 1.

The schematic illustration of the sitting position which runs in a horizontal plane in the arrow direction ($Pf_1$) and ($Pf_2$) is illustrated in FIG. 3g, with it being clarified that the seat (9) can be displaced in the horizontal plane in order to increase or to reduce the distance of the seat (9) from the user (P). Adaptation to the height takes place via adjustment of the frame.

FIGS. 4a and 4b show schematically the adaptation of the frame of the locomotion aid from FIG. 1 to the height of a person (P) by means of the height-adjustable legs (2) in side view, wherein the height adjustment according to FIG. 4c can take place at a first height ($H_1$) and with a first radius ($R_1$) and at a second height ($H_2$) with a second radius ($R_2$) according to FIG. 4d.

During the height adjustment via the four lateral tube profiles, not only does the height change, but also at the same time an adaptation of the supporting surface and of the movement space takes place, as illustrated in FIGS. 4c and 4d.

The arrangement and oblique position of the legs of the locomotion aid are configured here in such a manner that tilting of the locomotion aid and therefore falling of the user cannot occur even if the center of gravity of the locomotion aid or the collator extends at a certain height beyond the supporting surface.

FIGS. 5a and 5b schematically illustrate the hip lock in the locomotion aid (1).

The hip lock (8) of the locomotion aid (1) comprises at least the following components here:
adaptation means (10), in order to trigger the self-adaptive locking mechanism of the hip lock (8),
connecting elements (11) between the outer walls of the hip lock (8),
a non-elastic outer side (12) of the hip lock (8),
a manual adjustment mechanism (13) for shortening the non-elastic outer side (12), a connecting element (14) between the hip lock (8) and the spring system (7) with a look function,
wherein "B" indicates a region in which the user or a person (P) is standing, as illustrated in FIG. 5a.

A corresponding device, for example in the form of the adaptation means (10), which is located on the inner side of the hip lock or is attached directly in the lumbar region of the user is joined here onto a wing-like structure which is placed in a semicircular manner around the body of the person (P) corresponding to the body circumference by means of the action of pressure (D), indicated by the arrows ($F_1$) and ($F_2$) and is therefore locked horizontally, as illustrated in FIG. 5b.

Owing to forearm-supported comportment and the lock in the hip and lumbar region, exercises are carried out in an upright body posture and a central position is ensured for unlimited movement with the rollator (1).

FIGS. 6a-6d show schematically the guiding back of the hip lock (8) before sitting down (FIG. 6a, FIG. 6c), during sitting down or when sitting (P) FIGS. 6b and 6d, and also the change in the adjustment of the rollator position in FIGS. 6c and 6d. The rollator (1) comprises the following components:
- self-adaptive hip lock (8)
- spring mechanism (7) which can be guided back horizontally
- mounting for hip lock (6)
- seat with integrated brake triggering mechanism (9)
- triggering mechanism with release (5').

The following advantages emerge from this arrangement:
- vertical movement of the upper body are possible despite fixing;
- positioning of the user takes place via the sides and the lower back region;
- the rollator (1) is preferably open toward the front in order to permit easy entry and exit;
- it has a rigid device, for better transmission of force;
- mechanism of the hip lock during sitting down.

During stressing while standing according to FIGS. 6a, 6c:
- if the spring is relaxed according to FIG. 6c;
- a rearwardly directed movement of the lumbar support is not possible (latched state);
- the position of the lumbar support according to FIG. 6a only permits movements of the person (P) in the vertical direction;
- in order to be able to sit down, the securing or the locking mechanism of the spring on the hip lock has to be released. This can take place via a triggering mechanism (5') on the hand grip according to FIG. 6c.

During stressing while sitting according to FIGS. 6b, 6d:
- by exertion of pressure of the upper body rearwards in the arrow direction (D), the spring according to FIG. 6b is compressed
- since the lumbar support is movable in the vertical direction, it is guided downwards during the sitting down and therefore provides a backrest for the back region during sitting
- a hip lock during the relaxed state according to FIG. 6c and during the tensioned state according to FIG. 6d.

By means of the selected seat braking system, the seat does not provide a complete seat surface and, to this end, is located at a height of approx. 75-80%, with regard to the standing height of the posterior. This results in two substantial advantages over a conventional seat at a corresponding standard seat height, i.e. approx. 50% with respect to the height of the posterior during standing. These are:

In an advantageous manner the user arrives more easily in the load-relieving rest position and also requires less force for standing up than in the case of a standard seat height. This advantage is of high importance in particular for use in the play sector since, during the phases of passive participation in a game, an energy-saving and secure position can be adopted and, during active participation in a game, an upright and play-ready body posture is rapidly available again.

In addition, it has been established that, particularly during therapeutic exercises while sitting, the higher sitting position permits more clearance with the upper extremities. The upper extremities would otherwise be greatly restricted at a normal standard seat height.

Manner of Operation of the Hip Lock:

While carrying out the movements when standing, the posterior or the legs does not or do not touch the seat since the hip lock keeps the user in a corresponding position at a distance from the seat. When sitting down, the securing mechanism (blocking) which, during use whilst standing, prevents the hip lock from springing rearwards is released via a pushbutton on the handle.

FIG. 7a shows schematically the vertical displacement of the hip lock of the locomotion aid from FIG. 1 with at least the following components:
- hip lock (8)
- guide element for vertical displacement (8') in the arrow direction (V)
- spring mechanism (7) which can be guided back horizontally FIG. 7b shows the side view and, in FIG. 7c, a top view of FIG. 7a is shown.

The braking impulse is achieved by the user (P) sitting down with his/her body weight onto the seat. In the process, a mechanism inside or outside the seat is stressed which compresses and passes on a substance in the form of air or a hydraulic fluid.

The braking action proceeds as follows:

Via brake hoses, the resulting pressure (F) is passed on to the braking rings which are located around the ball castors. The pressure obtains a reduction in the diameter of the individual braking rings and leads to braking of the balls.

Design of the ball castor with brake in the nonbraked state ($Z_{nb}$) and in the braked state ($Z_b$) in top view ($D_s$) and side view ($S_a$).

The device including the ball castor with brake has at least the following components:
- ball castor with brake (3)
- ball (3')
- braking ring (3")
- housing of ball castor ($3_g$) sealing ring against dirt ($3_{Sch}$)
- ball bearing ($3_K$)

The locomotion aid (1) therefore has four ball castors which can move in all directions of movement, for example forward, sideways, diagonally, backwards and on circular paths. As a result, all of the previously mentioned problems can be solved with this rollator.

The sphere of use of the novel rollator in the sports, dance and rehabilitation sectors is in sports halls or clinical facilities, wherein the locomotion aid is preferably operable on flat underlying surfaces, such as, for example, parquet or linoleum floors. For people who are not too greatly disabled, the use of the rollator is also possible on underlying surfaces which have joins or pronounced unevennesses, for example on carpet, tiles or lawns.

Figure 1:
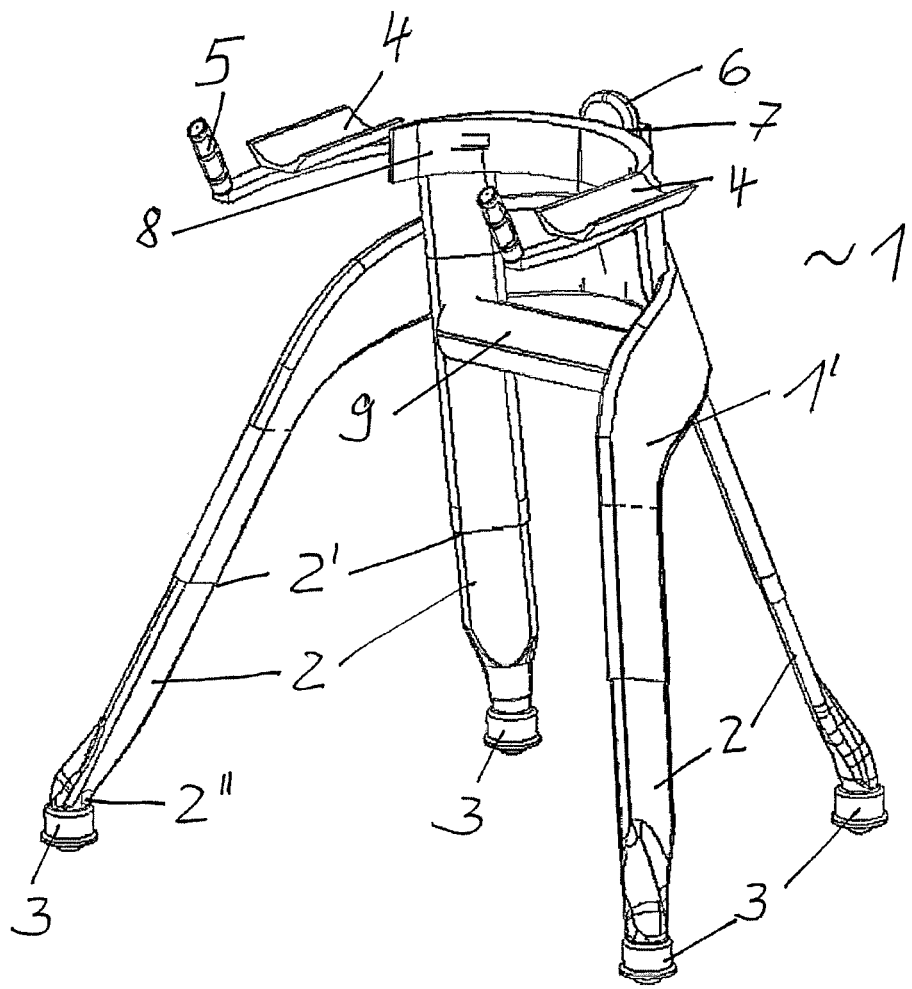
Figure 2A:
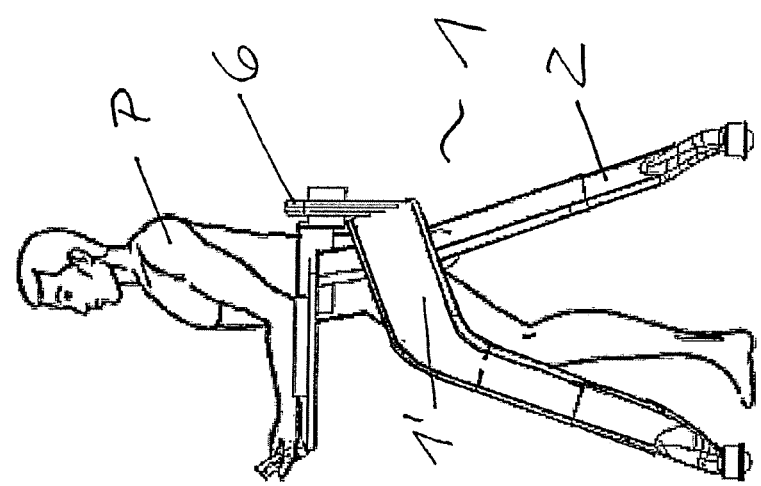
Figure 2B:
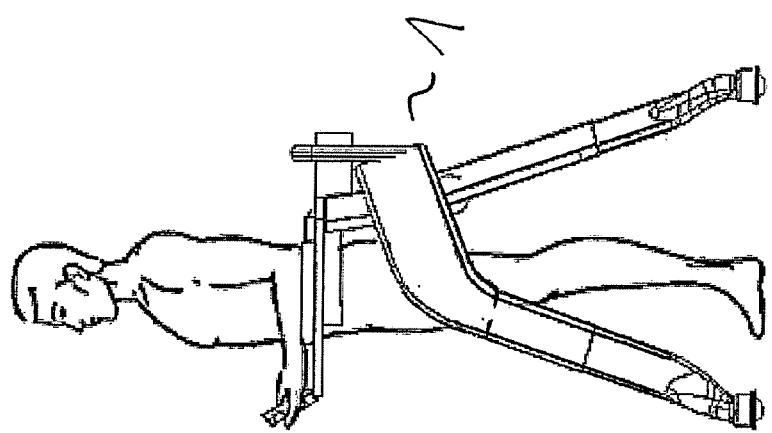
Figure 3F:
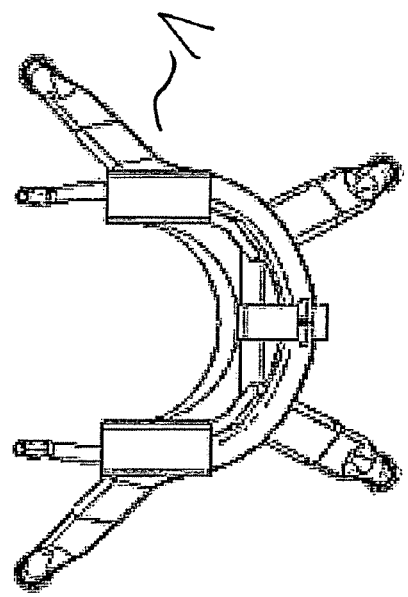
Figure 3E:
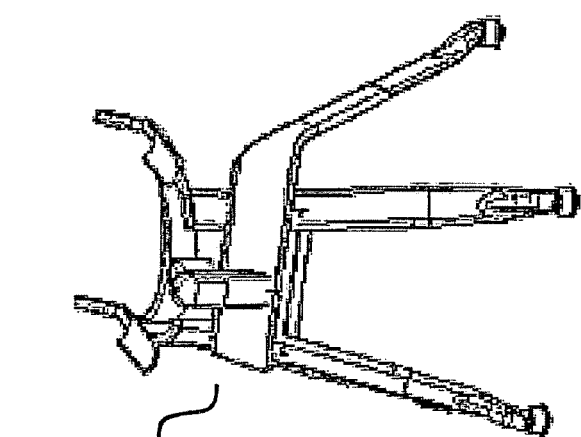
Figure 3D:
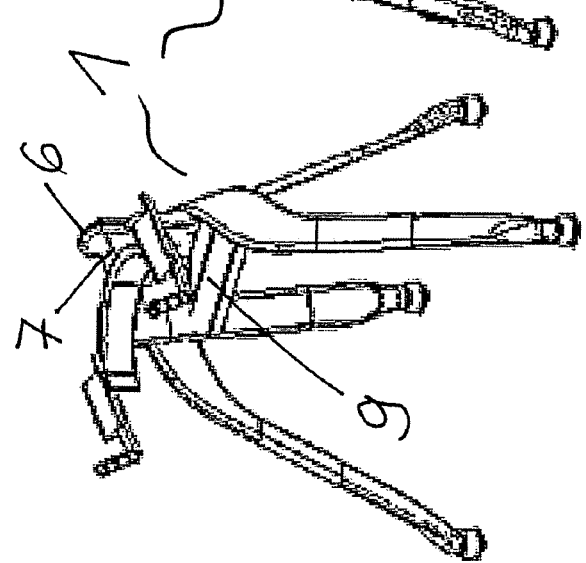
Figure 4C:
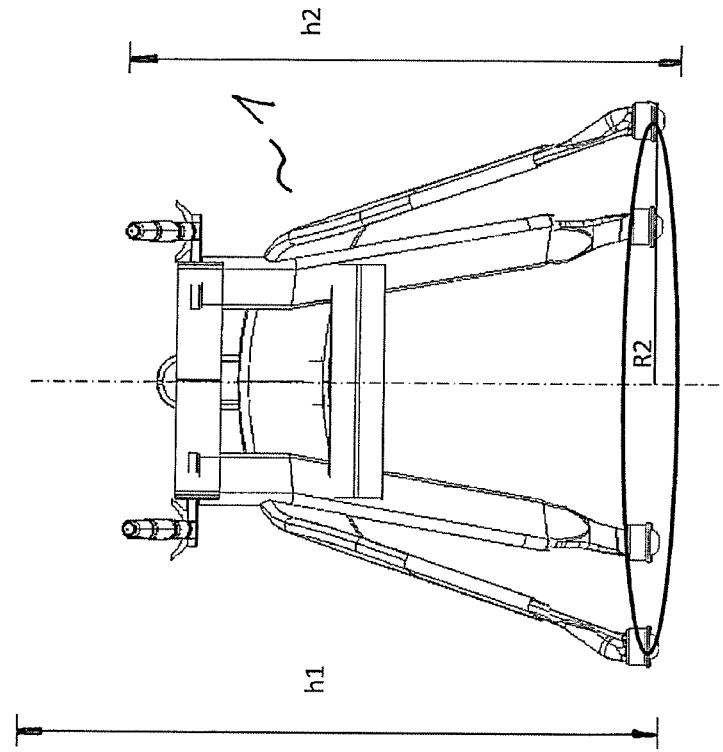
Figure 4D:
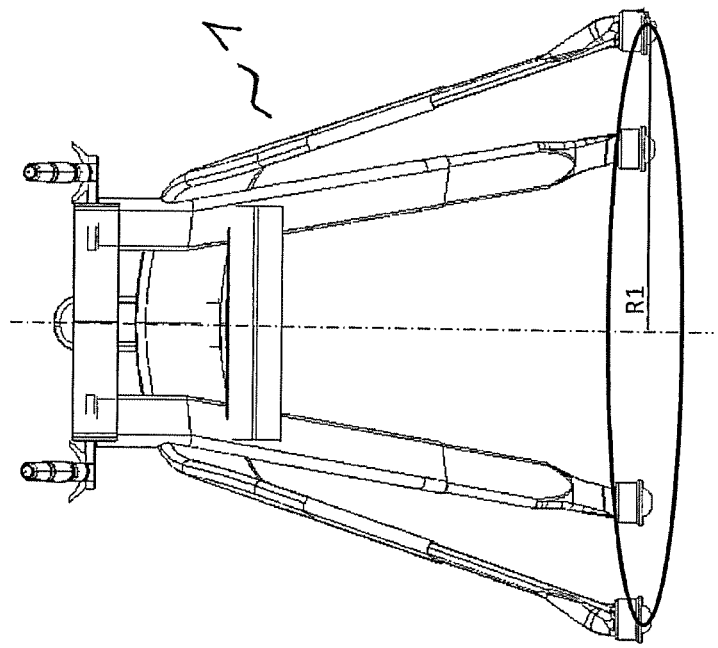
Figure 8:
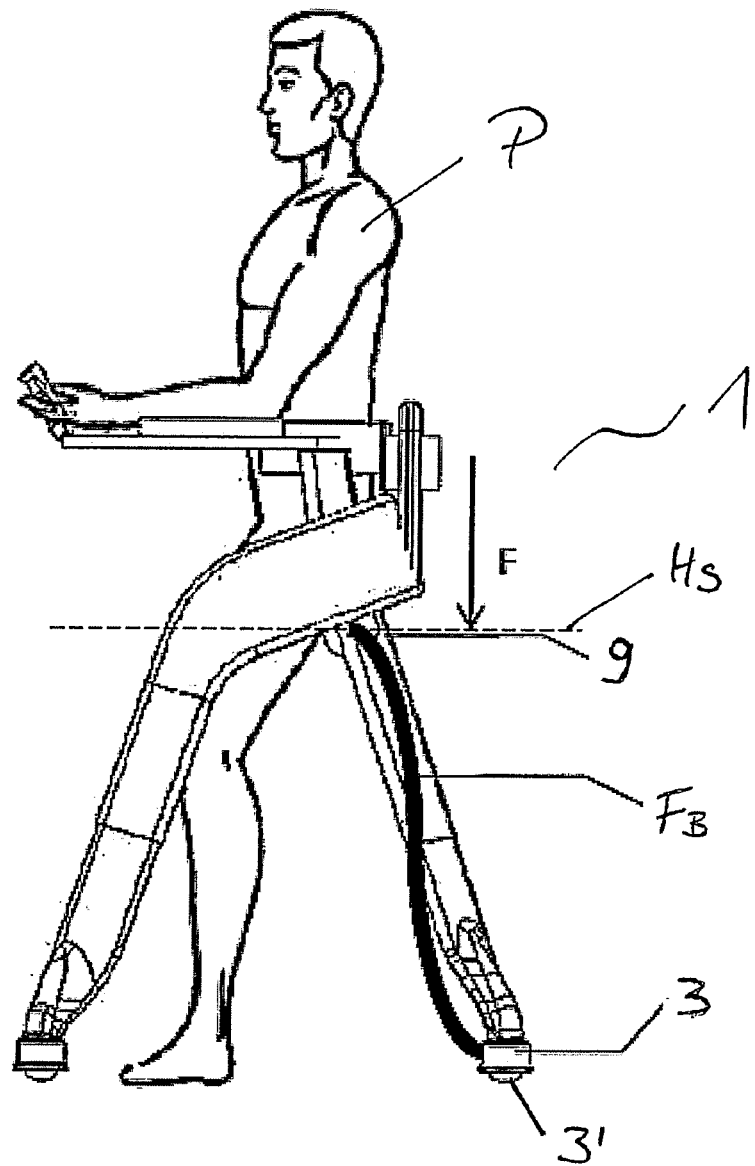
FIG. 8 shows a schematic illustration of the seat braking system of the locomotion aid from FIG. 1 with at least the following components:
- seat (9) with integrated brake triggering mechanism, illustrated as seat height (Hs)
- transmission of braking force ($F_B$)
- ball castor with brake (3) ball (3').
Figure 9:
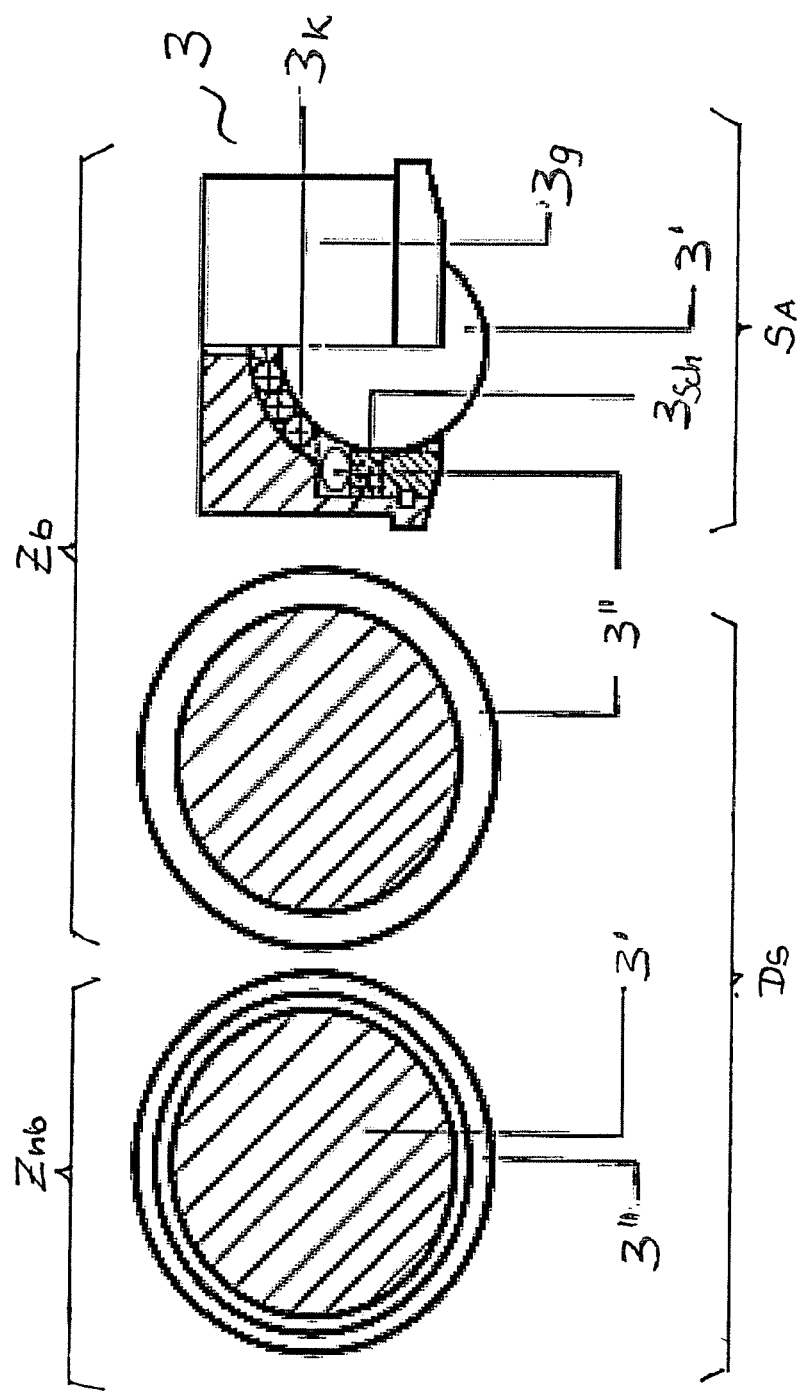
FIG. 9 illustrates the braking action mechanism on the ball castor.
Figure 10:
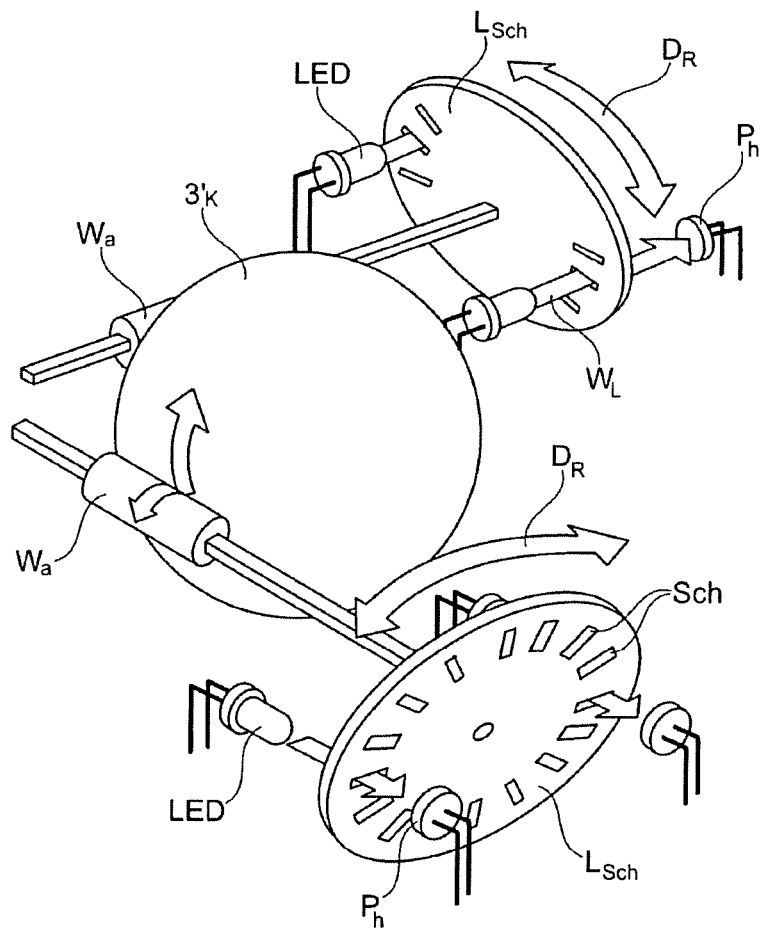
Figure 11:
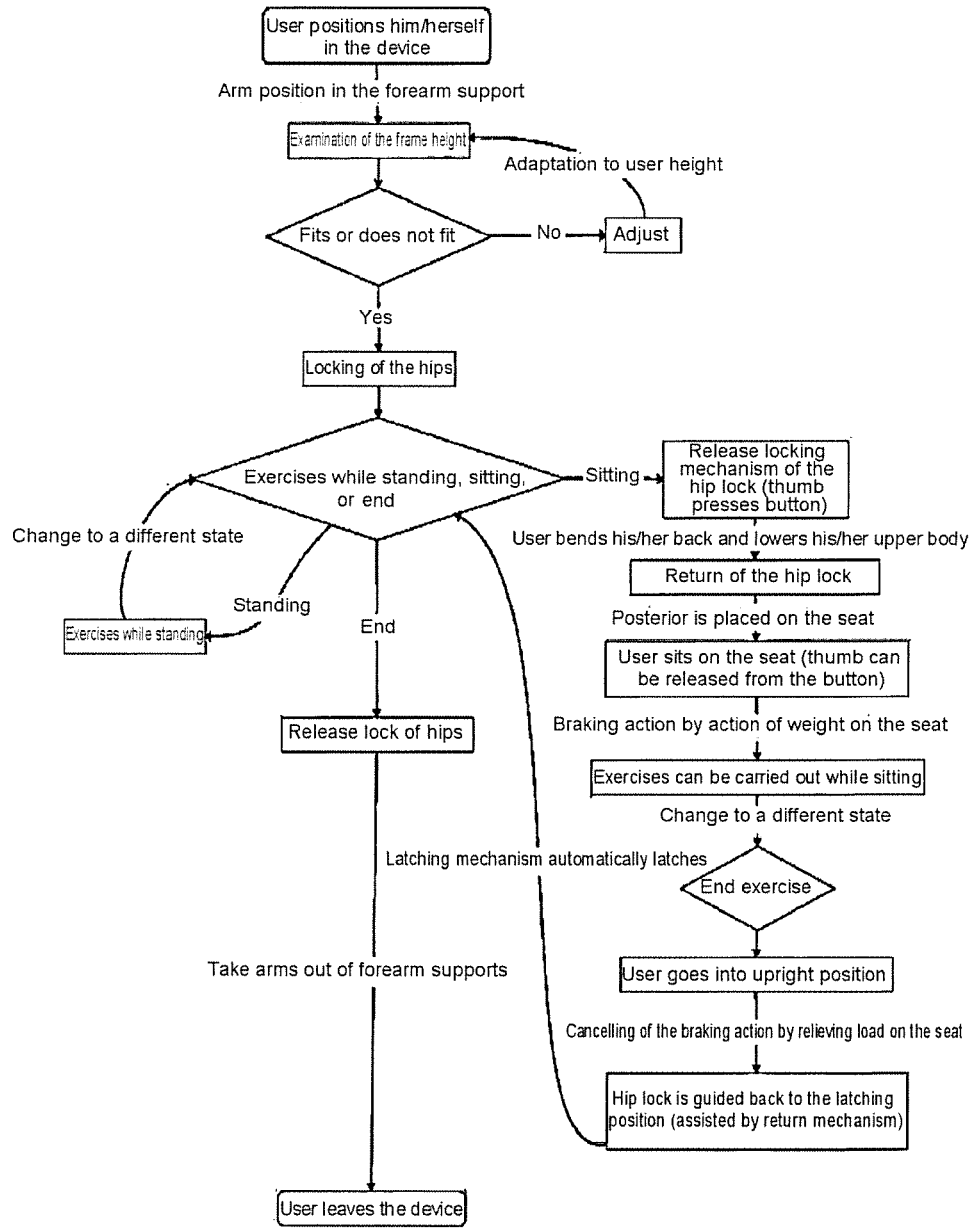

The principle of an optomechanical detection of movement [www.losbuenos.ch/ct2/Eingabegeraete/DOCS/Posten1-4_01b_V4.doc] is applied and shown schematically in FIG. 10 in the case of the ball castor ($3'_K$) of the device from FIG. 1. The rollator or the castor can also be coupled to a movement tracking system in order to be able to undertake an optomechanical detection of movement.

The optomechanical detection of movement is the detecting of the rollator movements which are converted, for example, via four ball castors ($3'_K$), respective perforated disks ($L_{sch}$) and associated light barriers into electric signals. The rolling movement of the ball ($3'_K$) is transmitted via two rollers (Wa) to two segmented disks ($L_{sch}$) which are perforated or are provided with slots (Sch) for the passage of light, with the light path ($W_L$), from the direction of rotation ($D_R$) and speed of which electrical pulses are generated via incremental transmitters with small light barriers. For example, LEDs (LED) can be used in conjunction with phototransistors (Ph). The relative coordinates of the individual balls are then set into a ratio with respect to one another via an algorithm. The movement of the user with the rollator, and not only the individual ball castor, can therefore be detected.

This permits the illustration of movement profiles in respect of movement accuracy, the distance covered or an entire implementation, with acceleration and speed values being included. The parameters listed by way of example permit a therapeutic evaluation and also evaluation diagnosing performance.

The hip lock and the associated positional lock of the user are intended to take place via a self-adaptive adjustment mechanism. By means of adaptive deformation or adaptation of the hip lock, a uniform distribution of pressure to the hips is provided. Neither the therapist nor the user has to undertake an adjustment here. As a result, not only is the outlay on adjustment reduced, but an erroneous adjustment is also avoided.

In the sphere of use of gymnastics and dance, the locomotion aid according to the invention can have the following features and advantages:
  simple positional lock in the lumbar region;
  supporting function for the forearms;
  rollator legs which are height-adjustable in ten steps;
  four freely movable castors;
  parking brake on all four castors.

In order to be able to impart a movement direction impulse to people wanting to use this rollator, a combination of the rollator (1) with a tactile stimulation system via a vibrating belt is possible.

Manner of Action of the Tactile Stimulation System Via Vibrating Belt:
  providing at least four, preferably eight vibrating elements which are placed in a circular manner around the user (P) with the aid of a belt;
    the vibrating elements are intended to be activatable individually in order to transmit direction and movement form, for example a direction or rotation;
    the information about the activation of the individual elements preferably takes place via radio signals;
    information is provided via movement detection of a person, for example of a trainer, who is showing the practitioner (P) the intended movements or exercises, or over the course of further therapy via an app which can be operated by the therapist.

The process sequence of the tactile stimulation via a vibrating belt can take place, firstly, by means of a therapist (a) demonstrating the exercise or, as shown in (b), by operation of a device by means of the therapist, and can be configured as follows:

Step 1: Signal Recognition
  (a) The movement specification takes place by means of the therapist by showing the exercises. The therapist here wears, for example, an acceleration sensor on his/her body which records and transmits the respective direction of movement.
  (b) The movement specification takes place by means of the therapist by operating a device, wherein the therapist could use, for example, an application (app) by means of which the therapist can specify the direction of movement for the learner via a touch function.

Step 2: Signal Transmission
  The signal transmission can take place both in case (a) and in case (b) via radio, for example by means of WLAN or Bluetooth.

Step 3: Signal Processing
  The signal processing can take place in both cases via the vibrating belt by the latter specifying the direction of movement by appropriate activation of the vibrating elements.

The use of the locomotion aid (rollator) can take place as described below:

The invention claimed is:

1. A locomotion aid for people with limited mobility, comprising:
  a frame having a first end and a second end;
  frame legs connected to the frame at the first end and at the second end of the frame;
  ball castors arranged on the frame legs;
  a hip or lumbar lock connected to the frame via a return mechanism and a mounting;
  a seat with an integrated brake triggering mechanism, wherein
  the seat is configured to interact with the hip or lumbar lock and the mounting in such a manner that the brake triggering mechanism is selectively triggered,
wherein the hip or lumbar lock comprises:
  an adapter which triggers a self-adaptive locking mechanism of the hip or lumbar lock;
  connecting elements between outer walls of the hip or lumbar lock;
  a non-elastic outer side of the hip or lumbar lock;
  a manual adjustment mechanism for shortening the non-elastic outer side; and
  a connecting element between the hip or lumbar lock.

2. The locomotion aid as claimed in claim 1, wherein the frame legs are height-adjustable.

3. The locomotion aid as claimed in claim 1, further comprising arm supports and handles, wherein the handles are arranged on the arm supports, and wherein the arm supports are connected to the hip or lumbar lock.

4. The locomotion aid as claimed in claim 1 wherein the frame is conical.

5. The locomotion aid as claimed in claim 1 further comprising a spacer configured for collision protection.

6. The locomotion aid as claimed in claim 1 wherein the return mechanism is or includes a spring system.

7. A method of using a locomotion aid as claimed in claim 1, comprising providing the locomotion aid to an individual in need thereof for use as a sports rollator, therapy rollator or dance rollator in setting selected from the group consisting of in private homes, in care homes, in hospitals, in sanatoria, and in sports facilities for senior citizens.

8. A locomotion aid for people with limited mobility, comprising:
 a frame having a first end and a second end;
 frame legs connected to the frame at the first end and at the second end of the frame;
 ball castors arranged on the frame legs;
 a hip or lumbar lock connected to the frame via a return mechanism and a mounting;
 a seat with an integrated brake triggering mechanism, wherein
 the seat is configured to interact with the hip or lumbar lock and the mounting in such a manner that the brake triggering mechanism is selectively triggered,
 wherein the return mechanism is or includes a spring system.

9. The locomotion aid as claimed in claim 8, wherein the frame legs are height-adjustable.

10. The locomotion aid as claimed in claim 8, further comprising arm supports and handles, wherein the handles are arranged on the arm supports, and wherein the arm supports are connected to the hip or lumbar lock.

11. The locomotion aid as claimed in claim 8 wherein the frame is conical.

12. The locomotion aid as claimed in claim 8 further comprising a spacer configured for collision protection.

13. The locomotion aid as claimed in claim 8 wherein the hip or lumbar lock comprises:
 an adapter which triggers a self-adaptive locking mechanism of the hip or lumbar lock;
 connecting elements between outer walls of the hip or lumbar lock;
 a non-elastic outer side of the hip or lumbar lock;
 a manual adjustment mechanism for shortening the non-elastic outer side; and
 a connecting element between the hip or lumbar lock.

14. A method of using a locomotion aid as claimed in claim 8, comprising providing the locomotion aid to an individual in need thereof for use as a sports rollator, therapy rollator or dance rollator in setting selected from the group consisting of in private homes, in care homes, in hospitals, in sanatoria, and in sports facilities for senior citizens.

* * * * *